(12) United States Patent
Knortz et al.

(10) Patent No.: US 10,954,796 B2
(45) Date of Patent: Mar. 23, 2021

(54) ROTOR BORE CONDITIONING FOR A GAS TURBINE ENGINE

(71) Applicant: United Technologies Corporation, Farmington, CT (US)

(72) Inventors: Christopher J. Knortz, West Hartford, CT (US); William W. Frank, Cheshire, CT (US); Erica J. Harvie, Middletown, CT (US); Conor Lee, West Hartford, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 155 days.

(21) Appl. No.: 16/102,120

(22) Filed: Aug. 13, 2018

(65) Prior Publication Data

US 2020/0049013 A1 Feb. 13, 2020

(51) Int. Cl.
*F01D 5/08* (2006.01)
*F02C 7/18* (2006.01)
*F04D 29/32* (2006.01)
*F04D 29/053* (2006.01)
*F02C 6/08* (2006.01)

(52) U.S. Cl.
CPC ............ *F01D 5/082* (2013.01); *F01D 5/081* (2013.01); *F02C 6/08* (2013.01); *F02C 7/18* (2013.01); *F04D 29/053* (2013.01); *F04D 29/324* (2013.01); *F05D 2220/3216* (2013.01); *F05D 2240/11* (2013.01); *F05D 2260/201* (2013.01)

(58) Field of Classification Search
CPC .... F02C 6/08; F02C 9/18; F01D 5/085; F01D 5/087
See application file for complete search history.

(56) References Cited

U.S. PATENT DOCUMENTS

| | | | | |
|---|---|---|---|---|
| 3,678,555 A | * | 7/1972 | Hansen | F01D 5/3046 29/889.21 |
| 3,844,110 A | * | 10/1974 | Widlansky | F01D 25/125 60/39.08 |
| 4,127,988 A | | 12/1978 | Bercker | |
| 4,509,957 A | * | 4/1985 | Firey | C10J 3/04 166/305.1 |
| 4,880,354 A | * | 11/1989 | Teranishi | F01D 5/08 416/95 |
| H903 H | * | 4/1991 | Weinstein | 60/757 |
| 5,755,566 A | * | 5/1998 | Marsillo | F04C 2/123 418/200 |
| 5,984,637 A | * | 11/1999 | Matsuo | F01D 5/081 415/115 |
| 6,132,163 A | * | 10/2000 | Andrews | E02F 3/3405 414/685 |
| 9,145,771 B2 | | 9/2015 | Malmborg | |

(Continued)

FOREIGN PATENT DOCUMENTS

WO WO-2017069249 A1 * 4/2017 ........... F04D 29/053

*Primary Examiner* — Nathaniel E Wiehe
*Assistant Examiner* — Wesley Le Fisher
(74) *Attorney, Agent, or Firm* — Carlson, Gaskey & Olds, P.C.

(57) ABSTRACT

A rotor assembly includes a plurality of rotor disks that each have a rim portion. The plurality of rotor disks includes a first rotor disk and at least one first bleed air passage that extends through a forward rim portion of the first rotor disk. At least one second bleed air passage that extends through an aft rim portion of the first rotor disk.

9 Claims, 3 Drawing Sheets

(56) References Cited

U.S. PATENT DOCUMENTS

| | | | | |
|---|---|---|---|---|
| 9,234,463 | B2* | 1/2016 | Benjamin | F02C 7/12 |
| 9,677,475 | B2* | 6/2017 | Merry | F02C 7/18 |
| 10,612,383 | B2* | 4/2020 | Moniz | F04D 29/584 |
| 2006/0104808 | A1* | 5/2006 | Dailey | F01D 5/082 |
| | | | | 415/115 |
| 2012/0027606 | A1* | 2/2012 | Malmborg | F04D 29/053 |
| | | | | 416/223 A |
| 2016/0076378 | A1* | 3/2016 | Bintz | F01D 5/081 |
| | | | | 416/95 |
| 2016/0333796 | A1* | 11/2016 | Hugon | F04D 19/02 |
| 2017/0002678 | A1* | 1/2017 | Subramanian | F01D 5/087 |
| 2017/0211590 | A1* | 7/2017 | Moniz | F01D 5/085 |
| 2017/0284411 | A1* | 10/2017 | Bentley | F04D 29/053 |
| 2018/0051710 | A1* | 2/2018 | Takamura | F02C 7/18 |
| 2019/0063224 | A1* | 2/2019 | Hashimoto | F04D 29/584 |

* cited by examiner

ROTOR BORE CONDITIONING FOR A GAS TURBINE ENGINE

STATEMENT REGARDING FEDERALLY SPONSORED RESEARCH OR DEVELOPMENT

This invention was made with Government support awarded by the United States. The Government has certain rights in this invention.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

To increase efficiency of the gas turbine engine, operating temperatures generally increase in the compressor and turbine sections. This increase in temperature results in a need to manage the heat the structure of the gas turbine engine can withstand to achieve a desired operating life span.

SUMMARY

In one exemplary embodiment, a rotor assembly includes a plurality of rotor disks that each have a rim portion. The plurality of rotor disks includes a first rotor disk and at least one first bleed air passage that extends through a forward rim portion of the first rotor disk. At least one second bleed air passage that extends through an aft rim portion of the first rotor disk.

In a further embodiment of the above, the plurality of rotor disks are configured to rotate with a shaft that has an internal cooling passage.

In a further embodiment of any of the above, at least one first bleed air passage and at least one second bleed air passage are in fluid communication with the internal cooling passage in the shaft.

In a further embodiment of any of the above, there is a second rotor disk. A rim of a second rotor disk includes at least one turbine bleed air passage.

In a further embodiment of any of the above, at least one turbine bleed air passage is in fluid communication with the internal cooling passage.

In a further embodiment of any of the above, the second rotor disk is located upstream of the first rotor.

In a further embodiment of any of the above, at least one rotor disk of the plurality of rotor disks is located between the first rotor and the second rotor.

In a further embodiment of any of the above, a cross-section area of at least one turbine bleed air passage is larger than a sum of a cross-sectional area of all of the at least one first bleed air passage and the at least one second bleed air passage.

In another exemplary embodiment, a gas turbine engine includes a compressor section connected to rotate with a turbine section by a shaft. The compressor section includes a plurality of rotor disks that each have a rim portion. The plurality of rotor disks includes a first rotor disk. At least one first bleed air passage extends through a forward rim portion of the first rotor disk. At least one second bleed air passage extends through an aft rim portion of the first rotor disk.

In a further embodiment of any of the above, at least one first bleed air passage and at least one second bleed air passage are in fluid communication with an internal cooling passage in the shaft.

In a further embodiment of any of the above, the internal cooling passage in the shaft directs bleed air from the compressor section to the turbine section.

In a further embodiment of any of the above, there is a second rotor disk. A rim of a second rotor disk includes at least one turbine bleed air passage.

In a further embodiment of any of the above, the second rotor disk is located upstream of the first rotor disk.

In a further embodiment of any of the above, at least one rotor disk of the plurality of rotor disks is located between the first rotor disk and the second rotor disk.

In a further embodiment of any of the above, a cross-sectional area of at least one turbine bleed air passage is larger than a sum of a cross-sectional area of all of the at least one first bleed air passage and the at least one second bleed air passage.

In another exemplary embodiment, a method of operating a gas turbine engine includes rotating a plurality of rotor disks. The plurality of rotor disks includes a first rotor disk. Bleeding core air flow of the gas turbine engine through at least one first bleed air passage that extends through a forward rim portion of the first rotor disk. Bleeding the core air flow through at least one second bleed air passage that extends through an aft rim portion of the first rotor disk.

In a further embodiment of any of the above, the method includes heating an upstream rotor cavity forward of the first rotor disk and a downstream rotor cavity aft of the first rotor disk while bleeding the core air flow.

In a further embodiment of any of the above, the method includes bleeding air off of the core air flow path through at least one turbine bleed air cooling passage in a rim of a second rotor disk.

In a further embodiment of any of the above, the at least one first bleed air passage, the at least one second bleed air passage, and the at least one turbine bleed air passage are in fluid communication with an internal cooling passage in a shaft connecting the rotor assembly and a turbine section.

In a further embodiment of any of the above, a cross-sectional area of at least one turbine bleed air passage is larger than a sum of cross-sectional areas of all the at least one first bleed air passage and the at least one second bleed air passage.

DETAILED DESCRIPTION

Figure 1:
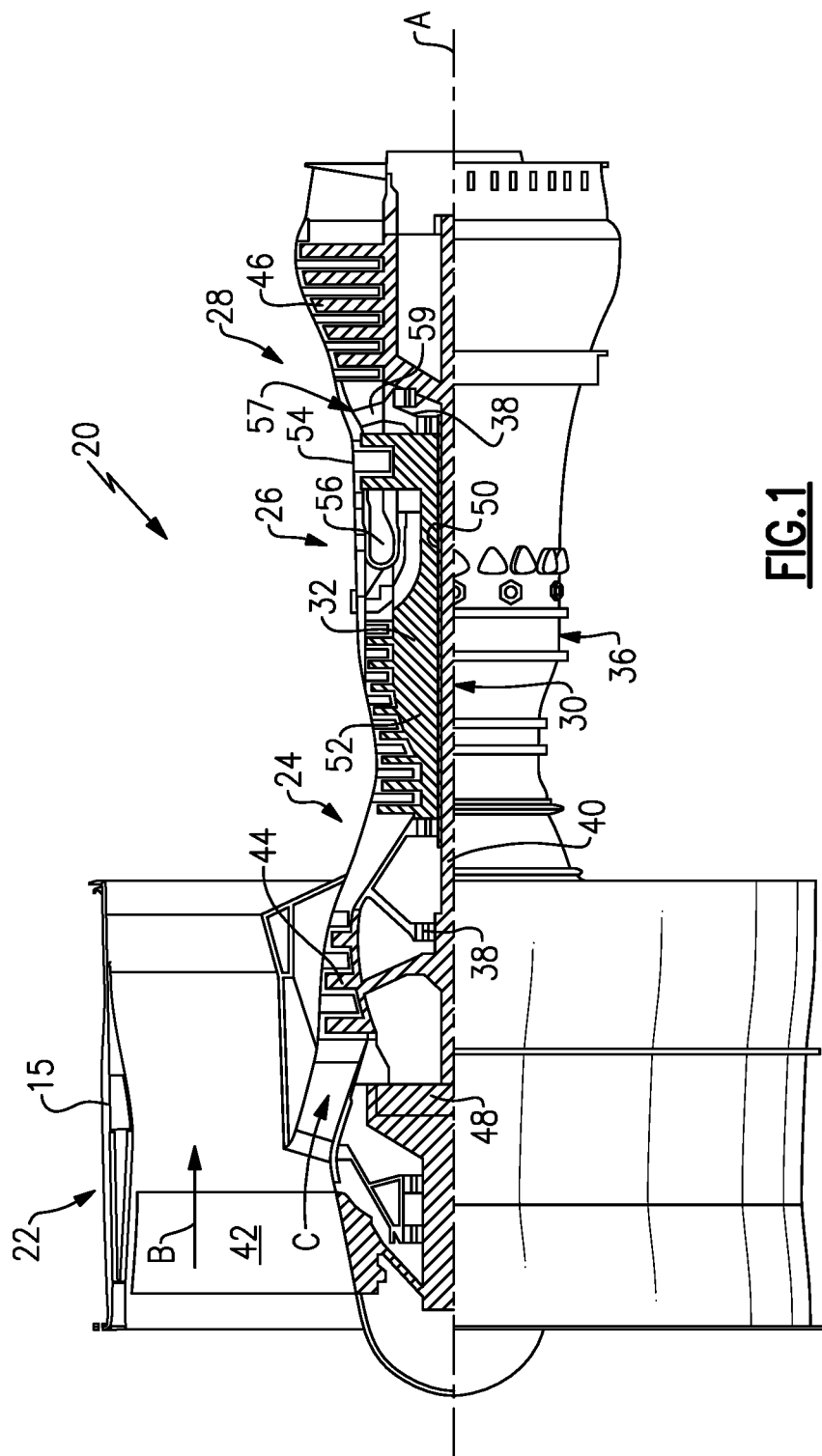
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbo fan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
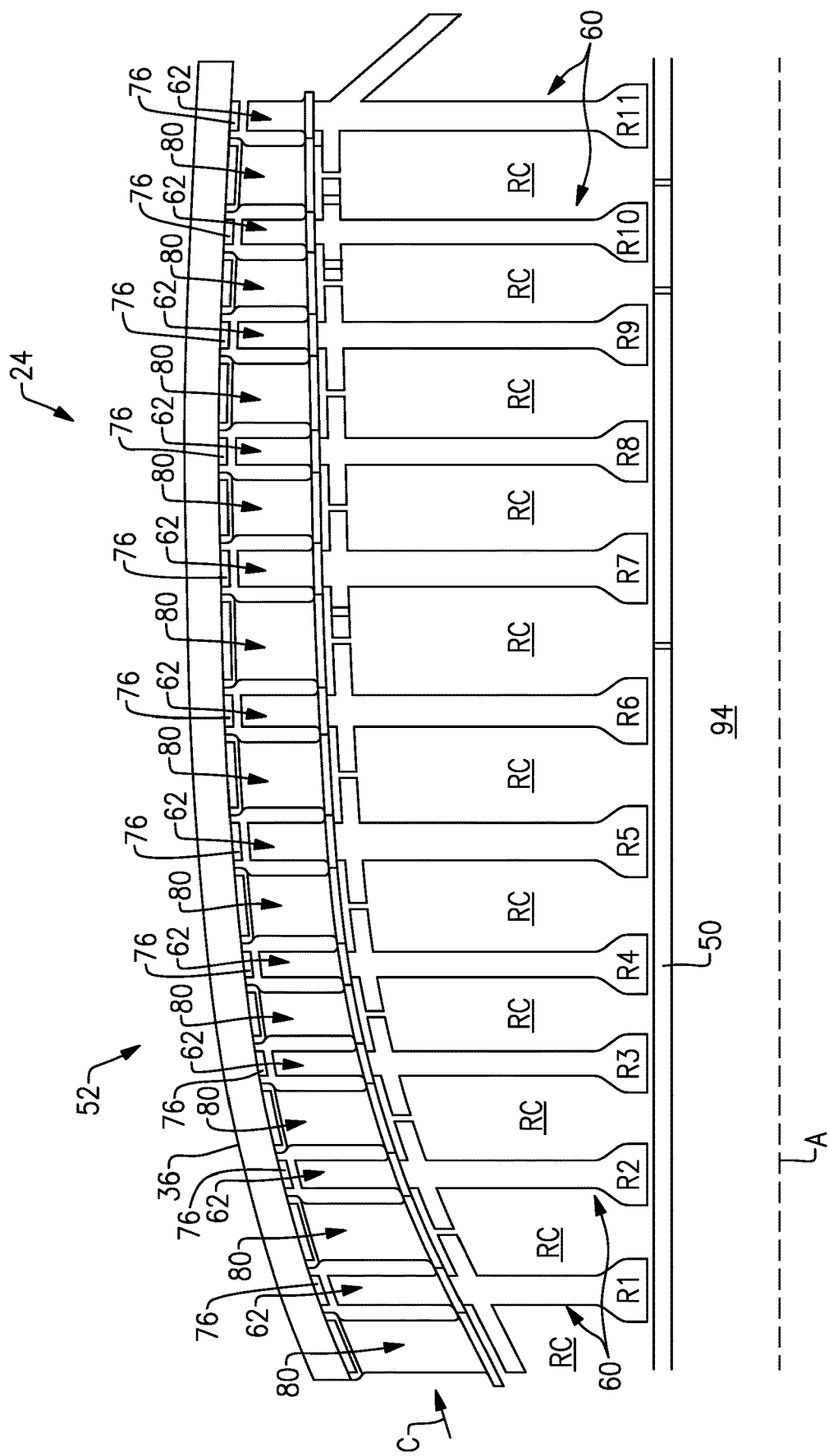
FIG. 2 is a schematic cross-sectional view of a high pressure compressor.
Figure 3:
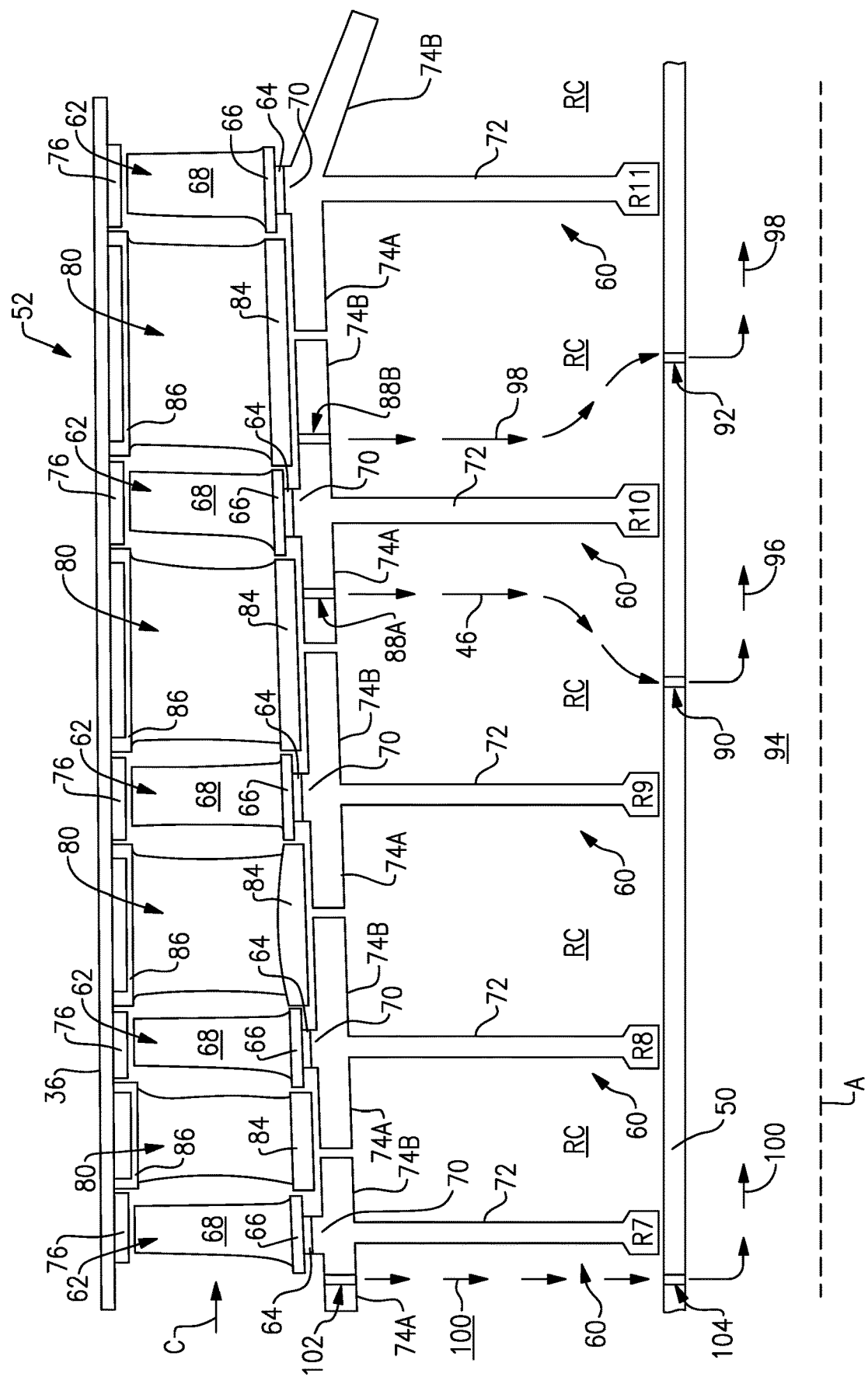
FIG. 3 is an enlarged schematic cross-sectional view of the high pressure compressor of FIG. 2.

FIGS. 2 and 3 illustrate schematic cross-sectional views of a high pressure compressor 52 in the compressor section 24 of the gas turbine engine 20. Although the illustrated example is directed to the high pressure compressor 52, this disclosure could benefit other sections of the gas turbine engine 20, such as the low pressure compressor 44 and the turbine section 28. In the illustrated example, the high pressure compressor 52 includes eleven rotor stages 60 each including a respective rotor disk R1-R11.

Each rotor stage 60 includes a plurality rotor blades 62 circumferentially spaced around one of the rotor disks R1-R11. Each of the plurality of rotor blades 62 include a root portion 64, a platform 66, and an airfoil 68. Each airfoil 68 extends radially outward toward a blade outer air seal (BOAS) 76. The BOAS 76 is attached to the engine static structure 36.

Each root portion 64 is received within a rim portion 70 of a respective one of the disk rotor disks R1-R11. In this disclosure, radial or radially, axial or axially, and circumference or circumferentially are in relation to the engine axis A unless stated otherwise.

Each of the rotor disks R1-R11 include a web portion 72 that extends radially inward from the rim portion 70 and arms 74A and 74B that extend axially forward and aft, respectively, of the rim portion 70. Rotor cavities RC are located are located adjacent each of the rotor disks R1-R11 and are at least partially defined by the forward and aft arms 74A, 74B, the web portion 72 on corresponding ones of the rotor disks R1-R11, and the outer shaft 50.

The plurality of rotor blades 62 are disposed in the core flow path C and contribute to pressurizing the core flow path C before the core flow path C is heated to a working temperature in the combustor section 26. The platforms 66 on the rotor blades 62 separate a gas path side inclusive of the airfoils 68 and a non-gas path side inclusive of the root portions 64.

A plurality of vanes 80 form a circumferential array around the engine axis A and separate adjacent circumferential arrays of the rotor blades 62 from each other. Therefore, individual arrays of the vanes 80 and individual arrays of the rotor blades 62 are in an alternating arrangement with each other extending along the core flow path C. Each of the plurality of vanes 80 includes at least one airfoil 82 that extends between a respective vane inner platform 84 and a vane outer platform 86.

During operation of the high pressure compressor 52, the air passing through the core flow path C and over the rotor blades 62 of each of the rotor stages 60 increases in temperature and pressure as the air approaches the rear of the high pressure compressor 52. During transient conditions of the gas turbine engine 20, such as during take offs, the temperature of the air in the core flow path C increases faster than surrounding structure can react to that temperature change. For example, the rim portions 70 and arms 74A, 74B of the rotor disks R1-R11 increase in temperature faster than the rotor cavities RC and web portions 72. This creates a temperature gradient in the rotor disks R1-R11 between respective rim portions 70 and arms 74A, 74B with the web portions 72. The temperature gradient is largest in the rear stages of the high pressure compressor 52 due to this region having the greatest temperature of air in the core flow path C in the high pressure compressor 52.

Thermal gradient between the rim portions 70 and arms 74A, 74B when compared to the web portions 72 of the rotor disks R1-R11, introduces thermal induced stress into the rotor disk R1-R11. Thermal induced stress can reduce the operating life of the corresponding rotor disk. This disclosure reduces thermal induced stress in the high pressure compressor 52 as wall be discussed below.

Although the illustrated example includes eleven (11) rotor stages 60 in the high pressure compressor 52 (See FIG. 2), this disclosure also benefits high pressure compressors 52 with fewer than eleven (11) stages or more than eleven (11) stages. In the illustrated example, the second to last rotor stage 60 corresponding to rotor disk R10 and includes at least one first bleed air passage 88A extending through the forward arm 74A of the rim portion 70. The at least one first bleed air passage 88A fluidly connects the core flow path C and the rotor cavity RC between the rotor disks R9 and R10. The at least one first bleed air passage 88A may include a plurality of first bleed air passages 88A that are circumferentially spaced around the forward arm 74A. The first bleed air passages 88A may be circular or oblong in cross-section.

Similarly, the rotor disk R10 includes at least one second bleed air passage 88B extending through the aft arm 74B of the rim portion 70. The at least one second bleed air passage 88B fluidly connects the core flow path C and the rotor cavity RC between rotor disks R10 and R11. The at least one second bleed air passage 88B may include a plurality of second bleed air passages 88B that are circumferentially spaced around the aft arm 74B. The second bleed air passages 88B may be circular or oblong in cross-section.

Because the at least one first and second bleed air passages 88A, 88B allow heated air from the core flow path C into the corresponding rotor cavities RC, the thermal gradient between the rim portion 70 and the web portion 72 of the rotor disks R9-R11 is reduced such that the thermal induced stress experienced by the rotor disks R9-R11 is reduced during transient operating conditions of the gas turbine engine. Air in the core flow path C becomes bleed air 96 when it travels through the at least one first bleed air passage 88A and is directed into a corresponding rotor cavity RC. From the rotor cavity RC, the bleed air 96 travels through at least one first turbine shaft passage 90 into an internal passage 94 in the outer shaft 50. From the internal passage 94, the bleed air 96 travels to the turbine section 28 for cooling components in the turbine section such as the high pressure turbine 54.

Similarly, air in the core flow path C becomes bleed air 98 when it travels through the at least one second bleed air passage 88B and is directed into a corresponding rotor cavity RC. From the rotor cavity RC, the bleed air 98 travels through at least one second turbine shaft passage 92 into the internal passage 94 in the outer shaft 50. From the internal passage 94, the bleed air 98 travels to the turbine section 28 for cooling components in the turbine section such as the high pressure turbine 54.

The high pressure compressor 52 also bleeds air from the core flow path C further forward to cool the turbine section 28. In the illustrated example, rotor disk R7 includes at least one turbine section bleed air passage 102 in the forward arm 74A of the rim portion 70 for directing bleed air 100 from the core flow path C into the rotor cavity RC defined by rotor disks R6-R7. From the rotor cavity RC the bleed air 100 travels through a forward turbine shaft passage 104 into the internal passage 94 to travel to the turbine section 28 for cooling.

Because the turbine section bleed air passage 102 is further forward in the high pressure compressor 52, a temperature and pressure of the bleed air 100 is lower than a temperature and pressure of the bleed air 96, 98. Because the bleed air 100 is at lower temperature and pressure compared to the bleed air 96, 98, the bleed air 100 is able to more effectively cool the turbine section 28.

Furthermore, a sum of the cross-sectional area of all of the turbine section bleed air passages 102 is greater than a sum of the cross-sectional area of the first and second bleed air passages 88A, 88B. In one non-limiting example, an amount of bleed air 96, 98 traveling through all of the first and second bleed air passages 88A, 88B is significantly less than an amount of bleed air 100 traveling through all of the turbine section bleed air passages 102.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A rotor assembly comprising:
    a plurality of rotor disks each having a rim portion, wherein the plurality of rotor disks includes a first rotor disk and the plurality of rotor disks are configured to rotate with a shaft having an internal cooling passage;
    at least one first bleed air passage extending through a forward rim portion of the first rotor disk, the first bleed air passage having an entire perimeter defined by the forward rim portion;
    at least one second bleed air passage extending through an aft rim portion of the first rotor disk, the second bleed air passage having an entire perimeter defined by the aft rim portion, wherein the at least one first bleed air passage and the at least one second bleed air passage are in fluid communication with the internal cooling passage in the shaft; and
    a second rotor disk, wherein a rim of the second rotor disk includes at least one turbine bleed air passage in fluid communication with the internal cooling passage and a cross-sectional area of the at least one turbine bleed air passage is larger than a sum of a cross-sectional area of all of the at least one first bleed air passage and the at least one second bleed air passage.

2. The rotor assembly of claim 1, wherein the second rotor disk is located upstream of the first rotor disk.

3. The rotor assembly of claim 2, further comprising at least one rotor disk of the plurality of rotor disks located between the first rotor disk and the second rotor disk.

4. A gas turbine engine comprising:
a compressor section connected to rotate with a turbine section by a shaft, wherein the compressor section includes:
  a plurality of rotor disks each having a rim portion, wherein the plurality of rotor disks includes a first rotor disk; and
  at least one first bleed air passage extending through a forward rim portion of the first rotor disk and at least one second bleed air passage extending through an aft rim portion of the first rotor disk, wherein the at least one first bleed air passage and the at least one second bleed air passage are in fluid communication with an internal cooling passage in the shaft;
  a second rotor disk having a rim with at least one turbine bleed air passage, wherein a cross-sectional area of the at least one turbine bleed air passage is larger than a sum of a cross-sectional area of all of the at least one first bleed air passage and the at least one second bleed air passage.

5. The gas turbine engine of claim 4, wherein the internal cooling passage in the shaft directs bleed air from the compressor section to the turbine section.

6. The gas turbine engine of claim 4, wherein the second rotor disk is located upstream of the first rotor disk.

7. The gas turbine engine of claim 6, further comprising at least one rotor disk of the plurality of rotor disks located between the first rotor disk and the second rotor disk.

8. A method of operating a gas turbine engine comprising:
rotating a plurality of rotor disks, wherein the plurality of rotor disks includes a first rotor disk;
bleeding core air flow of the gas turbine engine through at least one first bleed air passage extending through a forward rim portion of the first rotor disk and bleeding the core air flow through at least one second bleed air passage extending through an aft rim portion of the first rotor disk;
heating an upstream rotor cavity forward of the first rotor disk and a downstream rotor cavity aft of the first rotor disk while bleeding the core air flow; and
bleeding air off of the core air flow path through at least one turbine bleed air cooling passage in a rim of a second rotor disk, wherein a cross-sectional area of the at least one turbine bleed air passage is larger than a sum of cross-sectional areas of all the at least one first bleed air passage and the at least one second bleed air passage.

9. The method of claim 8, wherein the at least one first bleed air passage, the at least one second bleed air passage, and the at least one turbine bleed air passage are in fluid communication with an internal cooling passage in a shaft connecting the plurality of rotor disks and a turbine section.

* * * * *